INVENTOR.
Rudolf Pfister

United States Patent Office 3,554,042
Patented Jan. 12, 1971

3,554,042
CONTINUOUS REGULATABLE DRIVE
Rudolf Pfister, Schaan, Liechtenstein, assignor to Ernst Ackermann, Wallisellen Zurich, Switzerland
Filed June 20, 1969, Ser. No. 835,138
Int. Cl. F16h 21/14
U.S. Cl. 74—69
12 Claims

ABSTRACT OF THE DISCLOSURE

A continuously variable drive having a driving shaft and a driven shaft in alignment relative to each other. A plurality of shifting mechanisms are provided with means connected to the shafts in order to vary the drive ratio between the two shafts.

---

The present invention relates to a continuously variable drive with a driving shaft and with a driven shaft aligned with the former as well as with several shifting systems arranged as a planetary gear in regard to the driven shaft which shifting systems run freely in one rotational direction and cooperate on a positively connected basis with the driven shaft in the other rotational direction.

Continuously variable drives of the above-mentioned type have an eccentric control ring revolving with the driving shaft for regulation of the transmission ratio which acts upon the control mechanisms by means of control segments and cranks mounted articulately in said segments. For a change in the revolution per minute ratio, the eccentricity of the control ring in changed in regard to the driving shaft by means of a control mechanism which has numerous complicated and accordingly expensive elements which are partly sensitive and subject to breakdowns.

The present invention has for an object to avoid these disadvantages and at the same time making the elements operate so that the power transfer from the driving shaft to the shifting mechanisms takes place in such a manner that one can omit the change in the eccentricity of the control ring or of an eccentric pin corresponding in its funtion to said ring. According to the invention, this is accomplished by the fact that three rods connected articulately with one another by a common free joint bolt at one of its two ends each, namely a connecting rod, a shifting rod, and an adjusting rod are assigned to each shifting mechanism which rods are likewise mounted articulately at their other ends and to be sure at least one of the connecting rods assigned to the shifting mechanisms is mounted directly on a single cam which is solid in relation to the driving shaft, each shifting rod on a cam of the pertinent shifting mechanisms and the adjusting rods on a joint bolt, each being connected with an adjusting device and whose axial position for the regulation of revolution per minute ratios is variable as compared to the axial position of the assigned shifting mechanism.

Figure 1:
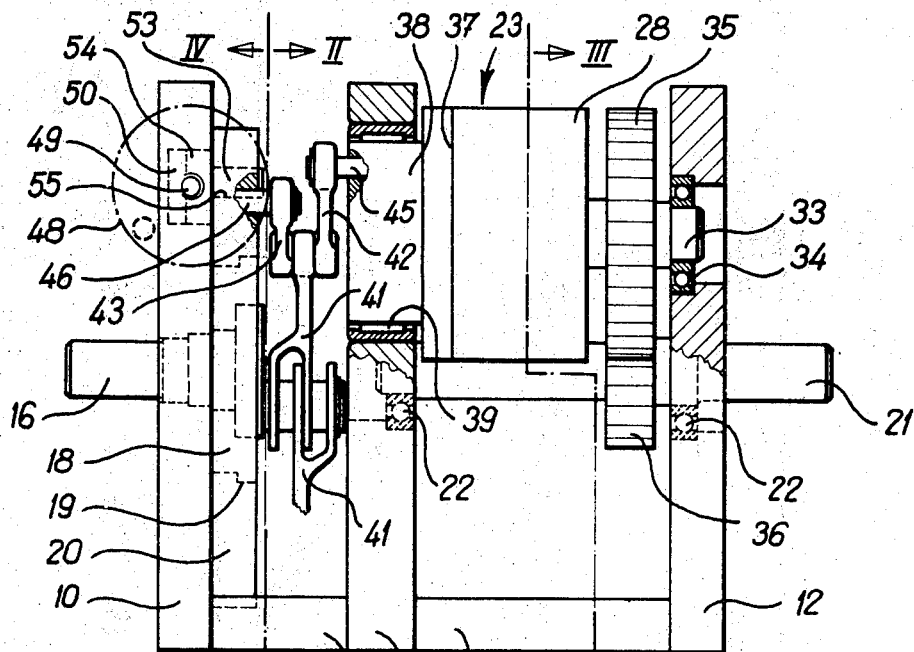
Figure 2:
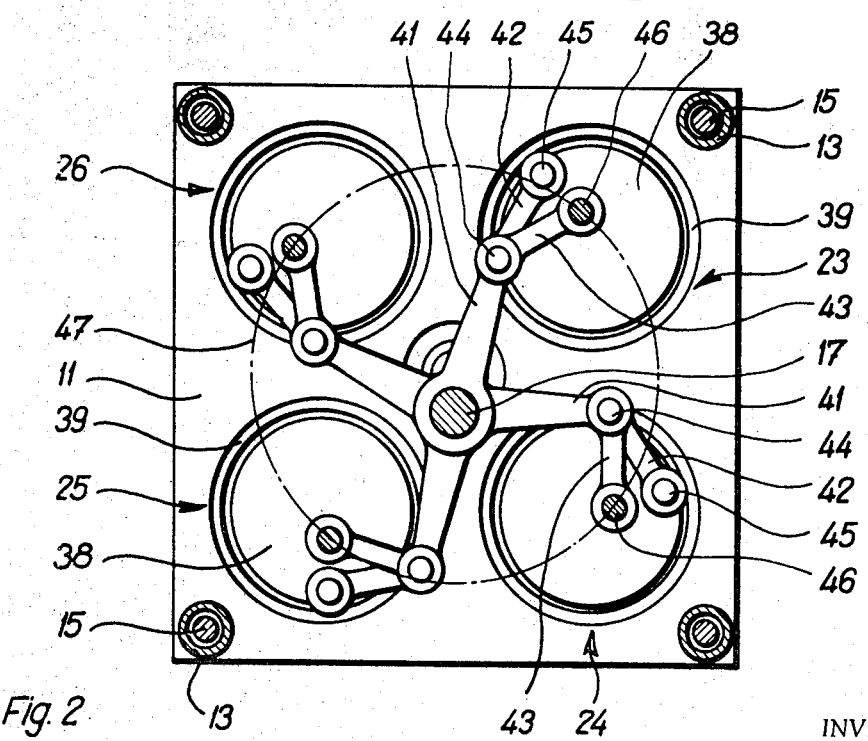
Figure 3:
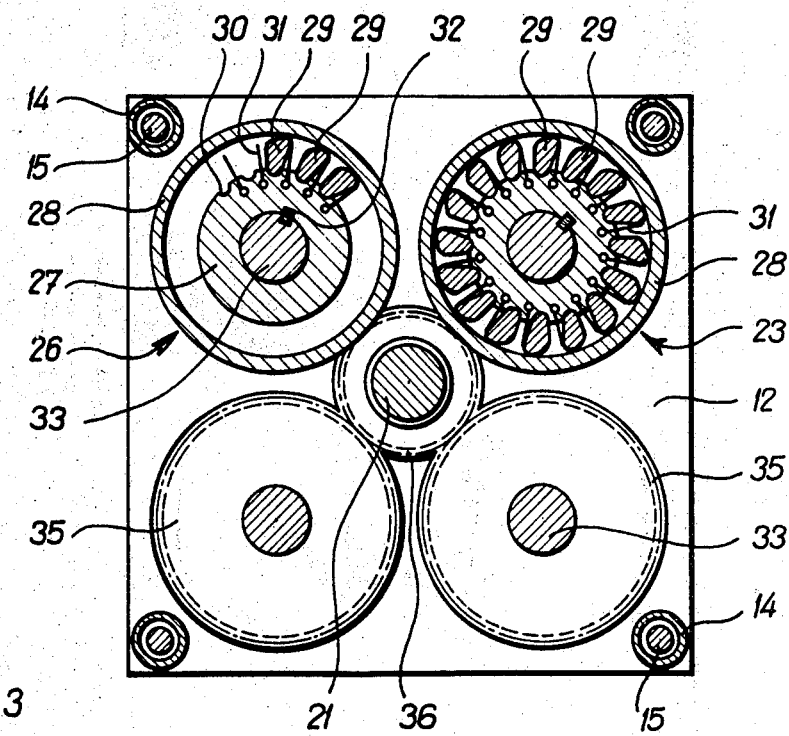
Figure 4:
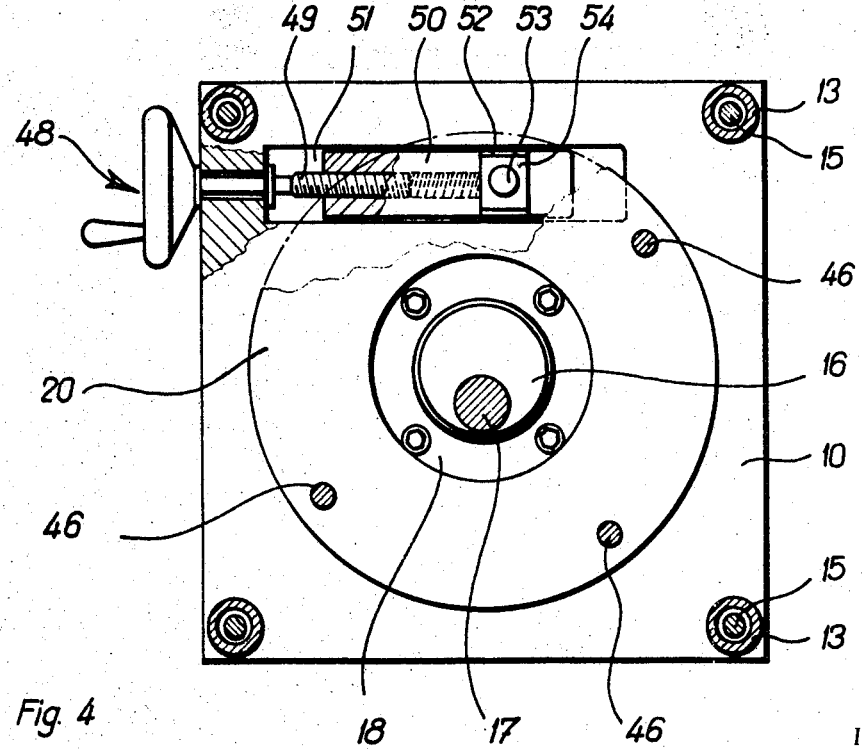
Figure 5:
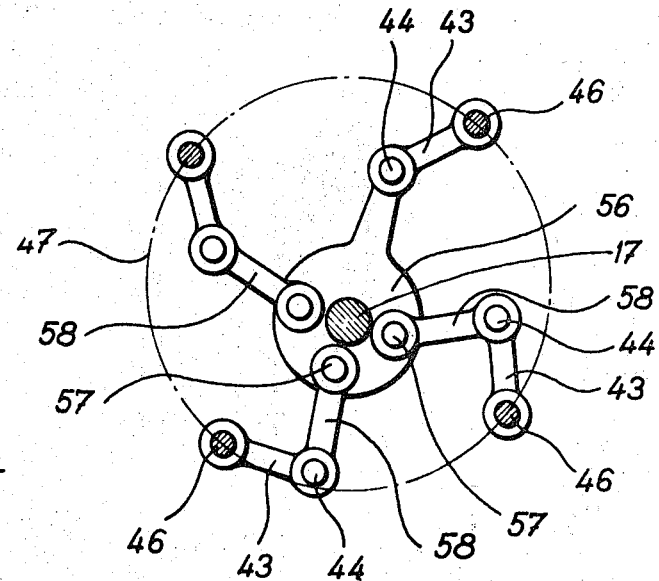
Figure 6:
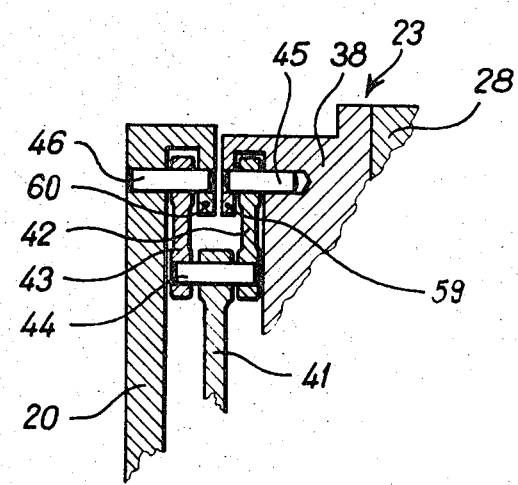
Figure 7:
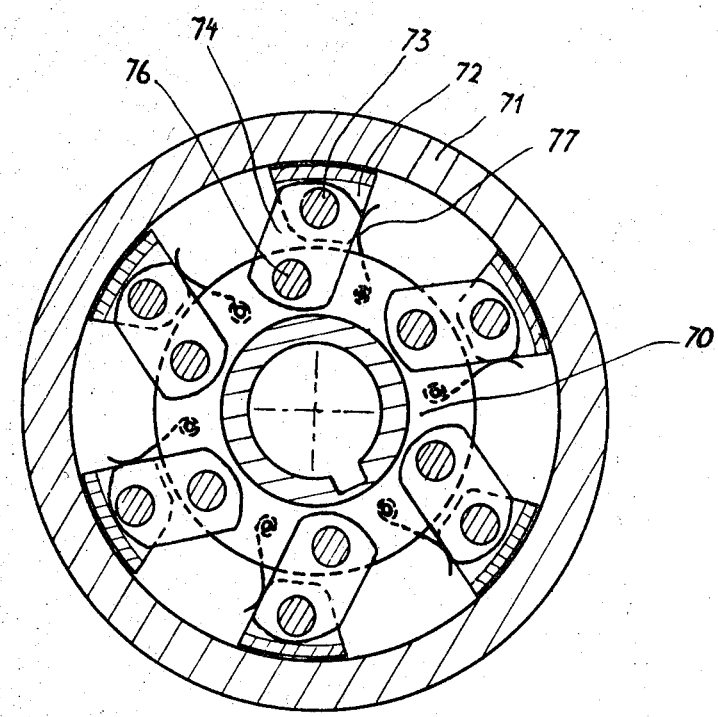

Further objects of the invention will be apparent from the following description when considered in connection with the accompanying drawings in which, FIG. 1 shows a side view partly in section of a continuous drive, FIG. 2 is a cross-section taken on line II—II in FIG. 1 in the direction of the arrows, FIG. 3 is a cross-section taken on line III—III in FIG. 1 in the direction of the arrows, FIG. 4 is a cross-section taken on line IV—IV in FIG. 1 in the direction of the arrows, FIG. 5 is a cross-sectional view of a modified arrangement of the connecting rods, and FIG. 6 is a sectional view of a detail of FIG. 1 and, FIG. 7 is a cross-sectional view of a modified structure of a shim-free wheeling mechanism.

The continuously variable drive according to FIGS. 1 to 4 has three heavy mounting plates 10, 11 and 12 arranged in parallel to one another which are held apart at their corners by distancing tubes 13 and 14 and are connected with one another by bolts 15 arranged at the corners. For clarification, the upper distancing tubes and the pertinent bolts are not shown in FIG. 1. The driving shaft 16 is mounted in the center part of the mounting plate 10, said shaft at that end pointing toward the mounting plate 11 having a fixed eccentric peg 17. A holding ring 18 for bearings has been arranged concentrically around the driving shaft 16 on the inside of mounting plate 10, the periphery 19 of said ring provided with a step serving for mounting and for holding a circular adjusting disk 20, which is likewise arranged concentrically in relation to the driving shaft 16. The driving shaft 16 is mounted on the one hand in the mounting plate 10 and on the other hand in the holding ring 18 on antifriction bearings, which have not been shown in the drawing.

A driven shaft 21 is arranged in alignment with the driving shaft 16 and it is mounted in the mounting plates 11 and 10 on a ball bearing 22 each. In the space between the central mounting plate 11 and the mounting plate 12 on the driven side, four equal shim-free wheeling mechanisms 23, 24, 25 and 26 have been arranged in the manner of planet members in relation to the driven shaft 21 as shifting mechanisms. Every shim-free wheeling mechanism 23, 24, 25 or 26, according to FIG. 3, has an inside ring 27, and an outside ring 28, also numerous shims 29 arranged in between. Each of the shims at the same time is seated on the periphery of the inside ring 27 in a groove 30 running parallel to its axis having a sector-like cross-section. Furthermore a leaf spring 31 projecting from the inside ring 27 in a radial direction has been provided for each shim 29, which spring holds the pertinent shim 29 in contact with the outside ring 28. The shims 29 are shaped in a known manner in such a way that the outside ring 28 can revolve freely clockwise in relation to the inside ring 27 (FIGS. 2 and 3), so that however, in the case of rotation of the outside ring 28 in a counterclockwise direction, shims 29 will brace and clamp themselves between the inside ring 27 and the outside ring 28 as a result of which the inside ring 27 is carried along free from slipping. In order to center the inside ring 27 in relation to the outside ring 28, everyone of the shim-free wheeling mechanisms 23, 24, 25 and 26 has antifriction bearings not shown in the drawing.

The inside ring 27 of each shim-free wheeling mechanism 23, 24, 25 and 26 has been placed torsionally on its shaft 33 each by means of a wedge 32 which shaft has been mounted on only one side in a ball bearing 34 in the mounting plate 12 on the driven side. Between the latter and each of the shim-free wheeling mechanisms 23, 24, 25 and 26, a gear 35 has been pulled up or adjusted torsionally on each shaft 33 which gear meshes with a sun wheel 36 seated on the driven shaft 21.

Bearing disks 38 have been flanged onto the ends 37 pointing toward the driving side of the outside rings or disks 28 of the shim-free wheeling mechanisms 23, 24, 25 and 26, said discs being mounted in needle bearings 39 arranged in the middle mounting plate 11.

Three hinge rods or links 41, 42 and 43, each of which has a bearing bushing at its ends, are arranged on each shim-free wheeling mechanism 23, 24, 25 and 26 in the space between the middle mounting plate 11 and the adjusting disk 20. The three hinge rods or links 41, 42 and 43, which always cooperate, namely a connecting rod 41, a shifting rod 42 and an adjusting rod 43, whose length measured from joint axis to joint axis is equal to the length of a shifting rod 42, are connected articulately with one another at one of their two ends by a common, free joint bolt or pin 44, that is to say, a bolt which otherwise has not been mounted. The other ends of each of the three rods 41, 42 and 43 are likewise mounted articulately and, to be sure, the connecting rods 41, of which only two have been drawn in FIG. 1 for the sake of clarity on the eccentric pin 17 of the driving shaft 16, the shifting rods 42 on a pin 45 attached on the bearing members 38 of the shim-free wheeling mechanisms 23, 24, 25 and 26, and the adjusting rods 43 on a joint pin 46 each attached in the adjusting disk 20. The axes of the four joint or pins 46 lie on a circle which is concentric in relation to the driving shaft 16, the so-called adjusting circle 47, which has been drawn in FIG. 2 with a dash-dot line, and to be sure on the intersections of two diameters standing perpendicular in relation to one another with the adjusting circle 47. In order to achieve a uniform transmission of movement from the driving shaft 16 to the shim-free wheeling mechanisms 23, 24, 25 and 26, it will be much to the purpose to select the radius of the adjusting circle 47 larger than the distance of the axes of the shim-free wheeling mechanisms 23, 24, 25 and 26 from the axis of the driving shaft 16, but smaller than the sum of this distance and of the distance of the axis of the pin 45 from the axis of the pertinent shim-free wheeling mechanisms 23, 24, 25 and 26.

The adjusting disk 20, mounted rotatably on the holding ring 18 (FIGS. 1 and 4), forms an esesntial component of the adjusting arrangement for the regulation of the revolutions per minute ratio. A threaded spindle 49 provided with a hand wheel 48 has been provided for the operation of the adjusting arrangement, by means of which spindle an essential block-shaped sliding element 50 can be moved back and forth in a recess 51 in the mounting plate 10 on the driving side. For the changeover of the back and forth movement of the sliding element 50 to a revolving movement of the adjusting disk 20, a sliding block 54 provided with a peg or pin 53, has been arranged in a transverse groove 52 of the sliding member 50, the pin 53 of said sliding block engaging in a bore 55 of the adjusting disk 20. The revolving or adjusting range of the adjusting disk 20 is given essentially by the difference in the lengths of the recess 51 in the mounting plate 10 and of the sliding element 50 guided therein. Since the threaded spindle 49 has a self-locking effect if the thread pitch is sufficiently small, one can generally speaking, do without a special fixing device for the adjusting disk 20.

If the sliding member 50 is pushed into its right-hand extreme position seen in FIG. 4, then the axes of the four joint pins 46 attached in the adjusting disk 20 will lie on the circles described by the pins 45 attached in the shim-free wheeling mechanisms 23, 24, 25 and 26 around the axes of the shim-free wheeling mechanisms, that is to say, the pins 45 and the joint pins 46, in the case of the above mentioned extreme position of the adjusting disk 20, have aligned axes because of the equal length of the shifting links 42 and the adjusting rods 43. In checking these facts in FIGS. 2 and 4, one must take into consideration that the arrangement of the joint pins 46 in FIG. 2 because of the directions of projections II—II (FIG. 1), which are opposite each other are homologeous to the corresponding arrangement of the joint pins in FIG. 4. The extreme position of the joint pins 46 described, as compared to the axes of the shim-free wheeling mechanisms 23, 24, 25 and 26, corresponds to the zero point of the regulating range that is to say, no transmission of movement takes place from the driving shaft to the shim-free wheeling mechanisms.

Instead of the connecting rods 41 (FIG. 2), mounted directly on the eccentric shaft 17 of the driving shaft 16, the arrangement of a single main connecting rod or link element 56 mounted on the eccentric shaft 17 and of three secondary connecting rods 58, articulated on the main rod by means of joint pegs or pins 57 shown in FIG. 5, may be used for the transfer of the movement to the shifting mechanisms.

Furthermore, an attachment of the pins or bolts 45 or of the joint pins 46, in the bearing members 38, of the shifting mechanism 23 or of the adjusting disk 20 which has been improved as compared to FIG. 1 has been shown in FIG. 6. In the case of this variation both the bearing member 38 of the shifting mechanism 23, and the adjusting disk 20 have a peripheral part 59 or 60 encompassing the joint element of the articulated shifting or adjusting rods 42 and 43 which peripheral part permits an attachment of the cam bolt or pin 45 or of the joint bolt 46 on both sides. In this manner the stress on the pertinent joint bushings and bolts as compared to the design shown in FIG. 1, will be greatly reduced.

The method of use and operation of the above described continuously variable drive, will be described first in relation to the position of the adjusting disk 20 or of the joint bolts or pins 46 attached thereto, which becomes clear from FIG. 2. In the case of a continuous revolution of the driving shaft 16, for example in a clockwise direction (FIG. 2), the free joint bolts 44 carry out a reciprocal movement along a circular arc member, the center of which is the axis of the joint bolt or pin 46 on which the pertinent adjusting rod 43 has been mounted. This reciprocal movement is transmitted by means of the shifting rod 42 to the eccentric pin 45 attached in the bearing member 38 of the shim-free wheeling mechanisms 23, 24, 25 or 26 and thus to the outside ring 28 of the pertinent shim-free wheeling mechanism. Every outside ring 28 of the shim-free wheeling mechanism thus carries out a complete switching cycle in the form of a reciprocating revolving movement around a shifting angle depending on the position of the adjusting disk 20 or of the joint pin 46 attached therein, per revolution of the drivingshaft 16. Because of the regular arrangement of the four shim-free wheeling mechanisms 23, 24, 25 and 26 the above mentioned shifting cycles of the adjoining shim-free wheeling mechanisms have been phase shifted by 90 degrees in dependence on the rotational angle of the driving shaft 16. It furthermore becomes clear from FIG. 3 that the shims 29 of the shim-free wheeling mechanisms 23, 24, 25 and 26 will be braced between the inside ring 27 and the outside ring 28 whenever a torque acts on the outside ring 28 in relation to the inside ring 27 in counterclockwise direction. Since all inside rings 27 because the coupling is free from slipping by means of the planetary wheels 35 and the sun wheel 36 have the same angular speed, the above mentioned torque will occur at that of the four shim-free wheeling mechanisms 23, 24, 25 and 26 whose outside ring-angular speed in the counterclockwise direction is the highest. The remaining shim-free wheeling mechanisms whose outside ring angular speed is lower or which is pointed in clockwise direction will run freely. If one considers FIG. 2 as a snapshot of the course of the movement, then one can see from the relative position of the individual rods 41, 42 and 43 and joints or pegs, that in the case of a revolution of the driving shaft 16 in clockwise direction the counterclockwise angular speed of the outside ring of the shim-free wheeling mechanism 24 (bottom right) is the highest. After barely a quarter turn of the driving shaft 16 in a clockwise direction, the shim-free wheeling mechanism 25 (bottom left) takes over the transfer of the rotational movement to the driven side and the shim-free wheeling mechanism 24 runs freely which facts also are valid for the other two free wheeling mechanisms 23 and 26. The handling over of the transfer of movement from one free wheeling mechanisms to the other takes place each time whenever the counterclockwise angular speeds of these two free wheeling mechanisms are equal. In an analogous manner the two free wheeling mechanisms 26 and 23 will take over the transmission of movement after the half period described. Because of the lifting movements participating in the later transmission, the angular speed of the driven shaft 21 revolving clockwise shows a certain waviness which however can be reduced by suitable selection of the lengths of the rods and of the eccentricities as well as by the use of more than four free wheeling mechanisms. As one can easily demonstrate by a step-by-step follow-up of the course of the movement, the driven shaft 21 revolves always in a clockwise direction independently of the direction of revolution of the driven shaft 16. In the case of a change in the rotational direction and depending on the position of the adjusting disk 20, the transmission ratio may change.

The regulation of the revolutions per minute ratio may take place during the running or during standstill by rotation of the adjusting disk 20 in relation to the holding ring 18. The relationship of the number of revolutions of the driven shaft to the revolutions per minute of the driving shaft will become the smaller in this case, the smaller the distance of the joint bolts 46 attached in the adjusting disk 20 is from the circular arc on which the eccentrics 45 of the free wheeling mechanisms move since a reduction of the above mentioned distance is followed by a reduction of the shifting angle around which the outside rings 28 of the free wheeling mechanisms 23, 24, 25 and 26 carry out a reciprocating rotational movement during one revolution of the driving shaft 16. The shifting angle of the free wheeling mechanisms 23, 24, 25 and 26 becomes zero whenever the axes of the joint bolts 46 are brought into alignment with the axes of the eccentrics 45 of the free wheeling mechanisms through turning the adjusting disk 20. In that case the shifting rods 42 together with the adjusting rods 43 carry out merely a rocking motion around the axis which is common to the joint pins 46 and the eccentric pins 45 during a turning of the driving shaft 16 and no transfer of the revolving movement takes place from the driving shaft 16 to the driven shaft 21.

By suitable selection of the eccentricities and of the distances of the bearings, bushings and individual rods 41, 42 and 43 as well as by effective selection of the upper limit of the adjusting range, care has been taken in the case of the described embodiment presented by way of example, that the angle between the connecting rod 41 and the adjusting rod 43 measured for each connecting rod 41 from said rod in counterclockwise direction (FIG. 2) is smaller than 180 degrees in every possible operating state of the drive mechanism. The swinging angle of the adjusting rods or links 43 has thus been unequivocally determined for any desired position of the adjusting disk 20 within the adjusting range and no impermissible stresses of individual parts of the drive can occur. The latter could be the case of in the course of the movement, the axis of the free joint bolt or pin 44 would come to lie in the connecting plane through the axes of the assigned joint bolt 46 and the eccentric 17 of the driving shaft 16.

If one uses instead of the connecting rods 41 according to FIG. 2, mounted directly on the eccentric 17 of the driving shaft 16, the arrangement shown in FIG. 5, with a single main connecting member 56, and three secondary connecting links 58, articulated to the former, then as a result thereof, the method of operation described will not be influenced.

The advantages of the drive as described essentially consist therein that for the transmission of the movement from the driving shaft 16 to the free wheeling mechanisms 23, 24, 25 and 26 relatively simple and light hinge rods will be used, which in the case of the transmission of power are loaded only in traction or stress.

Furthermore, the driving side is loaded with relatively slight unbalances. The adjusting device for the regulation of the revolutions per minute ratio is constructed exceedingly simple and reliable and the angle by which the adjusting disk 20 must be twisted or adjusted in order to sweep the entire range of regulation is very small. The regulation of the revolutions per minute ratio can take place quickly and with little expenditure of energy.

The advantages of the shim-free wheeling mechanisms used in the embodiment described and given by way of example consist therein that because of the grooves on the periphery of the inside ring, a slipping of the shims will be avoided and a separate spring has been assigned to each shim. In the case of a break of a single spring, therefore, one must not yet count on the failure of the pertinent shim-free wheeling mechanism.

A slipping of the shims on the inside ring can be prevented also in the case of a further development of the invention and of an improved shifting mechanism according to FIG. 7 by the fact that they consist each time in several parts of a wedge jaw 72 abutting against the outside ring 71 and at least a swiveling arm 74 connected articulately therewith by means of a bolt 73, the other end of which in each instance has been articulated by means of another bolt 76 to the inside ring 70 whereby the wedge effect required for a drive will be achieved by the swinging arm since its two articulation points formed by the bolts 73 and 76, lie on two separate radii enclosing a sector angle. On the basis of this multisectional development it has also been possible and provided that the radius of the curved outside surface of the wedge jaw 72, abutting against the outside ring is equal to the inside radius of said outside ring, the wedge jaw therefore possessing complete surface contact with the outside ring which upon bracing leads to a great driving power effect and influences the life span of the shifting mechanism essentially in a positive sense, and particularly the development of notches created by wear is impossible in this design.

The wedge jaw at the same time has been developed preferably U-shaped whereby the bolt or pin 73 extends through the legs and the bridge between the legs has curved outside surface.

Even in this variation of the design a leaf spring 77 projecting in a radial direction from the inside ring has been provided on each shim, said spring holding the pertinent wedge jaw in contact with the outside ring so that between the shift return and the forward movement bringing about the bracing no play will develop. By the constant contact pressure of the wedge jaw by means of a spring, the further advantage will result that the operation of the shifting mechanism is noiseless. Likewise it is also possible instead of an articulation on the inside ring to carry out this on the inside ring depending on requirements so that thus the shifting operation can take place on the outside ring or on the inside ring whereby the shifting effect and function remain the same.

I claim:

1. Continuously variable drive comprising a driving shaft and a driven shaft aligned with the driving shaft, a plurality of shifting mechanisms arranged in the form of planets relative to the driven shaft, and which idle freely in one rotational direction and which cooperate with the driven shaft by positive connection in the other rotational direction, three rods connected articulately with one another by a common free joint pin at one of their two ends by means of a connecting rod, a shifting link and an adjusting link are provided for each shifting mechanism, said joint pin, rod and link being likewise articulately connected at their other ends, and at least one of the connecting rods of the shifting mechanisms being mounted directly on a single eccentric shaft fixed in relation to the driving shaft, each shifting link being mounted on a pin of the pertinent shifting mechanism and the adjusting links with each one on a joint pin connected with an adjusting member of which its axis position can be changed for the regulation of the revolutions per minute ratio as compared to the axis position of the shifting mechanism.

2. Continuously variable drive according to claim 1, in which a single connecting rod is mounted as a main connecting member directly on the eccentric shaft of the driving shaft, and the remaining connecting rods being articulated to the main connecting rod as secondary connecting rods.

3. Continuously variable drive according to claim 1, in which all connecting rods are mounted directly on the eccentric shaft of the driving shaft.

4. Continuously variable drive according to claim 1, in which the joint pins connected with the adjusting member are adjustable along an arc of an adjusting circle concentric in relation to the driving shaft.

5. Continuously variable drive according to claim 1, in which the adjusting member has a circular disk bearing the adjustable joint pins, said disk being arranged concentrically in relation to the driving shaft and which can be moved and fixed as compared to a bearing of said shaft.

6. Continuously variable drive according to claim 1, in which the lengths of the shifting links and of the adjusting rods, measured from joint axis to joint axis, are of equal length and in which the axes of the pins of the shifting mechanisms and the axes of the adjustable joint pins can be brought each time into an aligned position with the adjusting member which position corresponds to the zero point of the regulating range.

7. Continuously variable drive according to claim 1, in which the joint pins connected with the adjusting member are adjustable along an arc of an adjusting circle concentric in relation to the driving shaft, the radius of the adjusting circle being larger than the distance of the axes of the shifting mechanisms from the axis of the driven shaft, and smaller than the sum of this distance and the distance of the axes of the pins of the shifting mechanisms from the axes of the shifting mechanisms.

8. Continuously variable drive according to claim 1, in which at least four shifting mechanisms have been arranged in the form of planets relative to the driven shaft and in that they cooperate with the latter by means of gears.

9. Continuously variable drive according to claim 1, in which each shifting mechanism is a shim-free wheeling mechanism with an inside ring, an outside ring, and shims arranged in between and in which each shim is seated on the periphery of the inside ring, each one in a groove running in parallel to its axis and with an arc shaped cross section, and in which a leaf spring is provided projecting in a radial direction from the inside ring assigned to each shim, each spring maintaining its shim in contact with the outside ring.

10. Continuously variable drive according to claim 1, in which each shifting mechanism is a free wheeling mechanism with an inside ring, an outside ring and with shims articulated to thei nside ring and arranged between the two rings, and in which each shim consists of a wedge jaw abutting against the outside ring, and in which at least a swiveling arm is provided connected articulately by means of a bolt, the other end of said swinging arm being articulated each time to the inside ring by means of a further bolt and a leaf spring projecting in a radial direction from the inside ring for each shim, said spring maintaining the particular wedge jaw in contact with the outside ring.

11. Continuously variable drive according to claim 1, in which each shifting mechanism is a free wheeling mechanism with an inside ring, an outside ring and with shims articulated to the inside ring and arranged between the two rings, and in which each shim consists of a wedge jaw abutting against the outside ring, and in which at least a swiveling arm is provided connected articulately by means of a bolt, the other end of said swinging arm being articulated each time to the inside ring by means of a further bolt and a leaf spring projecting in a radial direction from the inside ring for each shim, said spring maintaining the particular wedge jaw in contact with the outside ring, the wedge jaw fitting with a curved outside surface against the inside of the outside ring and in which the curvature of radius of said outside surface of the wedge jaw being equal to the inside radius of the outside ring.

12. Continuously variable drive according to claim 1, in which each shifting mechanism is a free wheeling mechanism with an inside ring, an outside ring and with shims articulated to the inside ring and arranged between the two rings, and in which each shim consists of a wedge jaw abutting against the outside ring, and in which at least a swiveling arm is provided connected articulately by means of a bolt, the other end of said swinging arm being articulated each time to the inside ring by means of a further bolt and a leaf spring projecting in a radial direction from the inside ring for each shim, said spring maintaining the particular wedge jaw in contact with the outside ring, the wedge jaw being U-shaped with the bolt extending through the legs, and the bridge extending between the legs with curved outside surface which comes into contact with the outside ring.

References Cited

UNITED STATES PATENTS

| 1,803,458 | 5/1931 | Berry | 74—63 |
|---|---|---|---|
| 1,872,636 | 8/1932 | Greening et al. | 74—63 |
| 3,028,761 | 4/1962 | Cole, Jr. | 74—69 |

FOREIGN PATENTS

| 787,364 | 12/1957 | Great Britain | 74—63 |

FREDERICK L. MATTESON, JR., Primary Examiner

W. S. RATLIFF, JR., Assistant Examiner